(12) United States Patent
Miller et al.

(10) Patent No.: US 8,711,146 B1
(45) Date of Patent: Apr. 29, 2014

(54) METHOD AND APPARATUSES FOR SOLVING WEIGHTED PLANAR GRAPHS

(75) Inventors: Gary Lee Miller, Pittsburgh, PA (US); Ioannis Koutis, Pittsburgh, PA (US)

(73) Assignee: Carnegie Mellon University, Pittsburgh, PA (US)

(*) Notice: Subject to any disclaimer, the term of this patent is extended or adjusted under 35 U.S.C. 154(b) by 1206 days.

(21) Appl. No.: 11/998,382

(22) Filed: Nov. 29, 2007

Related U.S. Application Data

(60) Provisional application No. 60/861,514, filed on Nov. 29, 2006.

(51) Int. Cl.
*G06T 11/20* (2006.01)

(52) U.S. Cl.
USPC ........... 345/440; 345/619; 345/501; 382/225; 382/226; 382/227; 707/787; 707/798; 707/800; 708/446; 708/500; 708/501; 708/502; 708/607

(58) Field of Classification Search
USPC .......... 345/419, 440, 619, 501; 382/128, 130, 382/131, 224, 254, 154, 251, 225, 226, 382/227; 703/2, 14, 16; 707/797, 798, 800; 708/446, 500–502, 520, 607
See application file for complete search history.

(56) References Cited

U.S. PATENT DOCUMENTS

| | | | | |
|---|---|---|---|---|
| 4,933,889 A * | 6/1990 | Meshkat et al. | | 703/2 |
| 5,392,429 A * | 2/1995 | Agrawal et al. | | 708/446 |
| 5,557,710 A * | 9/1996 | Amdursky et al. | | 345/419 |
| 5,655,137 A * | 8/1997 | Kevorkian | | 712/17 |
| 6,078,938 A | 6/2000 | Pan et al. | | |
| 6,348,921 B1 * | 2/2002 | Zhao et al. | | 345/428 |
| 6,437,804 B1 * | 8/2002 | Ibe et al. | | 715/736 |
| 6,611,267 B2 * | 8/2003 | Migdal et al. | | 345/428 |
| 6,694,343 B2 * | 2/2004 | Forrest et al. | | 708/520 |
| 6,928,399 B1 * | 8/2005 | Watts et al. | | 703/2 |
| 7,023,432 B2 * | 4/2006 | Fletcher et al. | | 345/419 |
| 7,065,545 B2 | 6/2006 | Quintero-de-la-Garza | | |
| 7,089,275 B2 * | 8/2006 | Garg | | 708/446 |
| 7,526,495 B2 * | 4/2009 | Chai | | 1/1 |
| 7,769,032 B1 * | 8/2010 | Ou | | 370/401 |
| 7,844,656 B2 * | 11/2010 | Macready et al. | | 708/801 |
| 7,987,250 B2 * | 7/2011 | Pai | | 709/223 |
| 2003/0067461 A1 * | 4/2003 | Fletcher et al. | | 345/420 |
| 2004/0156321 A1 * | 8/2004 | Michael Walker et al. | | 370/254 |
| 2005/0222825 A1 * | 10/2005 | Feldmann et al. | | 703/2 |

(Continued)

OTHER PUBLICATIONS

Spielman, Daniel A., Teng, Shang-Hua; Nearly-Linear Time Algorithms for Preconditioning and Solving Symmetric, Diagonally Dominant Linear Systems; journal: CoRR; vol. abs/cs/0607105; arXiv:cs.NA/0607105v1, Jul. 24, 2006.

(Continued)

*Primary Examiner* — James A. Thompson
*Assistant Examiner* — Abderrahim Merouan
(74) *Attorney, Agent, or Firm* — David G. Oberdick; Peter J. Borghetti

(57) ABSTRACT

Methods and apparatuses for constructing a multi-level solver, comprising decomposing a graph into a plurality of pieces, wherein each of the pieces has a plurality of edges and a plurality of interface nodes, and wherein the interface nodes in the graph are fewer in number than the edges in the graph; producing a local preconditioner for each of the pieces; and aggregating the local preconditioners to form a global preconditioner.

14 Claims, 6 Drawing Sheets

(56) References Cited

U.S. PATENT DOCUMENTS

| | | | |
|---|---|---|---|
| 2006/0235667 A1* | 10/2006 | Fung et al. | 703/10 |
| 2007/0010979 A1* | 1/2007 | Wallis et al. | 703/10 |
| 2007/0047810 A1 | 3/2007 | Grady | |
| 2007/0080341 A1* | 4/2007 | Macready et al. | 257/31 |
| 2007/0157135 A1* | 7/2007 | Yang | 716/4 |
| 2007/0255707 A1* | 11/2007 | Tresser et al. | 707/6 |
| 2007/0258329 A1* | 11/2007 | Winey | 367/140 |
| 2008/0025633 A1* | 1/2008 | Szeliski | 382/274 |
| 2008/0235692 A1* | 9/2008 | Grabarnik et al. | 718/102 |
| 2009/0128556 A1* | 5/2009 | Fischer et al. | 345/420 |

OTHER PUBLICATIONS

Plotkin, Serge; Rao, Satish; Smith, Warren D.; Shallow excluded minors and improved graph decompositions; 1994; SODA: ACM—SIAM Symposium on Discrete Algorithms (A Conference on Theoretical and Experimental Analysis of Discrete Algorithms); pp. 462-470.

Doyle, Peter G. et al., Randon Walks and Electrical Networks, Mathematical Association of America, 1984, TOC.

Briggs, William L. et al., A Multigrid Tutorial, 2nd edition, Society for Industrial and Applied Mathematics, 2000, TOC.

Chung, F.R.K., Spectral Graph Theory, Regional Conference Series in Mathetmatics, vol. 92, American Mathematical Society, 1997, TOC.

Grady, Leo, Random Walks for Image Segmentation, IEEE Trans. on Pattern Analysis and Machine Intelligence, 2 (11): 1768-1783, 2006.

Tolliver, David et al., Graph Partitioning by Special Rounding: Applications in Image Segmentation and Clustering, Computer Vision and Pattern Recognition, CVPR, vol. 1, p. 1053-1060, New York, NY, 2005, IEEE.

Ng A. et al., on Special Clustering: Analysis and an Algorithm, 2001.

Fouss, Francois, at al., A Novel Way of Computing Similarities Between Nodes of a Graph, with Application to Collaborative Recommendation, ACM International Conference on Web Intelligence, p. 550-556, 2005.

Spielman, Daniel A. et al., Nearly-Linear Time Algorithms for Graph Partitioning, Graph Sparsification, and Solving Linear Systems, Proceedings of the 36th Annual ACM Symposium on Theory of Computing, p. 81-90, Jun. 2004.

Elkin, Michael et al., Lower-Stretch Spanning Trees, Proceedings of the 97th Annual ACM Symposium on Theory of Computing, p. 494-503, 2005.

Koutis, I. et al., A Linear Work, o(n 1/16) Time, Parallel Algorithm for Solving Planar Laplacians, Eighteenth Annual ACM-SIAM Symposium on Discrete Algorithms, p. 1002-1011, Jan. 2007.

Boman, Erik G. et al., Solving Elliptic Finite Element Systems in Near-Linear Time with Support Preconditioners, CoRR, cs.NA/0407022, 2004.

Avron, Haim et al., Combinatorial Preconditioners for Scalar Elliptic Finite-Elements Problems, under submission, 2006.

Spielman, Daniel A. et al., Faster Approximate Lossy Generalized Flow via Interior Point Algoritms, Proceedings of the 40th Annual ACM Symposium on Theory of Computing, May 2008.

Plotkin, S. et al., Shallow Excluded Minors and Improved Graph Decompositions, 1994, SODA: ACM-SIAM Symposium on Discrete Algorithms, A Conference on Theoretical and Experimental Analysis of Discrete Algorithms, p. 462-470.

Pan, Victor Y. et al., Fast and Efficient Parallel Solution of Sparse Linear Systems, SIAM J. Comput. 22(6): 1227-1250, 1993.

Trottenberg, Ulrich et al., Multigrid, Academic Press, 1st ed., 2000, TOC.

Koutis, Ioannis et al., Graph Partitioning into Isolated, High Conductance Clusters: Theory, Computation and Applications to Preconditioning, Symposium on Parallel Algorithms and Architectures (SPAA), 2008.

Koutis, Ioannis, Combinatorial and Algebraic Tools for Multigrid Algorithms, PhD thesis, CMU, May 2007, CMU CS Tech Report CMU-CS-07-131.

Gremban, Keith, Combinatorial Preconditioners for Sparse, Symmetric, Diagonally Dominant Linear Systems, PhD thesis, CMU, Oct. 1996, CMU CS Tech Report CMU-CS-96-123.

Maggs, Bruce M. et al., Finding Effective Support-Tree Preconditioners, Proceedings of the 17th Annual ACM Symposium on Parallel Algoritms, p. 176-185, Las Vegas, Jul. 2005.

Racke, Harald, Minimizing Congestion in General Networks, Proceedings of the 43rd Symposium on Foundations of Computer Science, p. 43-52, IEEE, 2002.

Bienkowski, Marcin et al., A Practical Algorithm for Constructing Oblivious Routing Schemes, Proceedings of the Fifteenth Annual ACM Symposium on Parallel Algorithms, p. 24-33, 2003.

Miller, Gary L. et al., Lower Bounds for Graph Embeddings and Combinatorial Preconditioners, Proceedings of the Sixteenth Annual ACM Symposium on Parallel Algorithms, p. 112-119, 2004.

Klein, Philip N., On Gazit and Miller's Parallel Algorithm for Planar Separators: Achieving Greater Efficiency through Randon Sampling, SPAA p. 43-49, 1993.

Vaidya, P.M., Solving Linear Equations with Symmetric Diagonally Dominant Matrices by Constructing Good Preconditioners, Oct. 1991.

Frederickson, Greg N., Fast Algorithms for Shortest Paths in Planar Graphs, with Applications, SIAM J. Comput., 16(6): 1004-1022, 1987.

Golub, G.H. et al., Matrix Computations, The John Hopkins University Press, Baltimore, 3rd ed., 1996, TOC.

Demmel, James W., Applied Numerical Linear Algebra, SIAM, 1997, TOC.

Hoperoft, John E., et al., Efficient Planarity Testing, J. ACM 21(4): 549-568, 1974.

Ramachandran, Vijaya et al., Planarity Testing in Parallel, J. Comput. Syst. Sci. 49(3): 517-561, 1994.

Klein, Philip N. et al., An Efficient Parallel Algorithm for Planarity, J. Comput. Syst. Sci., 37(2): 190-246, 1988.

Gazit, Hillel et al., A Parallel Algorithm for Finding a Separator in Planar Graphs, 28th Annual Symposium on Foundations of Computer Science, p. 238-248, Los Angeles, Oct. 1987, IEEE.

Kiwi, Marcos A. et al., Min-Max Boundary Domain Decomposition, Theor. Comput. Sci. 261(2): 253-266, 2001.

Goodrich, Michael T., Planar Separators and Parallel Polygon Triangulation, J. Comput. Syst. Sci., 51(3): 374-389, 1995.

Luby, Michael, A Simple Parallel Algorithm for the Maximal Independent Set Problem, SIAM J. Comput. 15(4): 1036-1053, 1986.

Reid-Miller, Margaret et al., List Ranking and Parallel Tree Con-Traction, John Reif ed., Synthesis of Parallel Algorithms, p. 115-194, Morgan Kaufmann, 1993.

Spielman, Daniel A., et al., Solving Sparse, Symmetric, Diagonally-Dominant Linear Systems in Time 0(nar.31), FOGS '03: Proceedings of the 44th Annual IEEE Symposium on Foundations of Computer Science, p. 416, IEEE Computer Society, 2003.

\* cited by examiner ously filed November 29, 2006.

METHOD AND APPARATUSES FOR SOLVING WEIGHTED PLANAR GRAPHS

CROSS-REFERENCE TO RELATED APPLICATIONS

This application claims priority from U.S. provisional patent application No. 60/861,514, filed Nov. 29, 2006, which is incorporated herein by reference. This application is related to U.S. patent application Ser. No. 12/483,750, filed Jun. 12, 2009.

STATEMENT REGARDING FEDERALLY-SPONSORED RESEARCH AND DEVELOPMENT

This invention was made, in part, with government support under Grant Numbers CCR-9902091, CCR-9706572, ACI 0086093, CCR-0085982 and CCR-0122581 awarded by the National Science Foundation. The United States government may have certain rights in this invention.

FIELD OF THE INVENTION

The present invention relates generally to computational methods and apparatuses to solve systems of linear equations.

BACKGROUND OF THE INVENTION

Graph Laplacians owe their name to Laplace's equation; they arise in its discretization. They are also intimately connected to electrical networks [Peter G. Doyle and J. Laurie Snell. Random Walks and Electrical Networks. Mathematical Association of America, 1984.]. Solving Laplacians in the context of those two classical scientific computing applications was important enough to motivate and sustain for decades the research on multigrid methods [William L. Briggs, Van Emden Henson, and Steve F. McCormick. A multigrid tutorial: second edition. Society for Industrial and Applied Mathematics, 2000.]. More recently, the reduction of symmetric diagonally dominant systems to Laplacians [Keith Gremban. Combinatorial Preconditioners for Sparse, Symmetric, Diagonally Dominant Linear Systems. PhD thesis, Carnegie Mellon University, Pittsburgh, October 1996. CMU CS Tech Report CMU-CS-96-123.], in combination with the observations of Boman et al. [Erik G. Boman, Bruce Hendrickson, and Stephen A. Vavasis. Solving elliptic finite element systems in near-linear time with support preconditioners. CoRR, cs.NA/0407022, 2004.], extended the applicability of Laplacians to systems that arise when applying the finite element method to solve elliptic partial differential equations.

Given the direct relationship of Laplacians with random walks on graphs [F. R. K. Chung. Spectral graph theory. Regional Conference Series in Mathematics, American Mathematical Society, 92, 1997.], it shouldn't be surprising that linear systems involving Laplacians quickly found other applications in Computer Science. Yet, when combinatorial preconditioners for accelerating the solution of Laplacian systems were introduced [P. M. Vaidya. Solving linear equations with symmetric diagonally dominant matrices by constructing good preconditioners. A talk based on this manuscript, October 1991.], very few could foresee the wide arc of applications that emerged during the last few years. Laplacian solvers are now used routinely, in applications that include segmentation of medical images [Leo Grady. Random walks for image segmentation. EEE Trans. on Pattern Analysis and Machine Intelligence, to appear, 2006.], or collaborative filtering [Francois Fouss, Alain Pirotte, and Marco Saerens. A novel way of computing similarities between nodes of a graph, with application to collaborative recommendation. In ACM International Conference on Web Intelligence, pages 550-556, 2005.]. They are also used as subroutines in eigensolvers that are needed in other algorithms for image segmentation [David Tolliver and Gary L. Miller. Graph partitioning by spectral rounding: Applications in image segmentation and clustering. In CVPR, 2006.], or more general clustering problems [A. Ng, M. Jordan, and Y. Weiss. On spectral clustering: Analysis and an algorithm, 2001.].

Besides the great impact on real world applications, the common thread among all these applications is that they generate graphs with millions or billions of vertices. Very often, the graphs are planar, as in the case of two dimensional elliptic partial differential equations. In several cases they additionally have a very simple structure. For example, the graphs arising in medical image segmentation are two and three dimensional weighted grids [Leo Grady. Random walks for image segmentation. EEE Trans. on Pattern Analysis and Machine Intelligence, to appear, 2006.]. Thus, it is extremely important to design fast and practical solvers that specialize in planar graphs.

The design of combinatorial preconditioners culminated in the recent breakthroughs of [Daniel A. Spielman and Shang-Hua Teng. Nearly-linear time algorithms for graph partitioning, graph sparsification, and solving linear systems. In Proceedings of the 36th Annual ACM Symposium on Theory of Computing, pages 81-90, June 2004.] and [Michael Elkin, Yuval Emek, Daniel A. Spielman, and Shang-Hua Teng. Lower-stretch spanning trees. In Proceedings of the 37th Annual ACM Symposium on Theory of Computing, pages 494-503, 2005.], that showed that general Laplacians can be solved in time $O(n \log^{O(1)} n)$, and planar Laplacians can be solved in time $O(n \log^2 n \log \log n)$, using as preconditioners low stretch trees. The upper bound in this approach probably cannot be improved beyond $O(n \log n)$, due to the log n lower bound associated with the average stretch of spanning trees. This is known to be suboptimal for certain classes of unweighted planar graphs, where multigrid methods work provably in linear time [William L. Briggs, Van Emden Henson, and Steve F. McCormick. A multigrid tutorial: second edition. Society for Industrial and Applied Mathematics, 2000.], matching up to a constant the lower bound. Such methods have not led to solutions that can be obtained in linear time. From a more practical point of view, one additional shortcoming of the preconditioner of [Michael Elkin, Yuval Emek, Daniel A. Spielman, and Shang-Hua Teng. Lower-stretch spanning trees. In Proceedings of the 37th Annual ACM Symposium on Theory of Computing, pages 494-503, 2005.], is that the algorithm for its construction is highly sequential. It is not known or obvious how to parallelize that algorithm in order to exploit the availability of a moderate number of processors in a parallel machine or in a distributed environment.

Accordingly, there is a need for improved methods and apparatuses which enable the solving of weighted planar graphs in less time such as, for example, the solving of weighted planar graphs in linear time.

BRIEF SUMMARY OF THE INVENTION

The present invention provides methods and apparatuses for solving weighted planar graphs with $O(n)$ work, in $O(n^{1/6})$ parallel time. The present invention bypasses the construction of a global low stretch tree for the given graph, which would be an initial step taken by existing methods such as that disclosed in [Michael Elkin, Yuval Emek, Daniel A. Spielman, and Shang-Hua Teng. Lower-stretch spanning trees. In Proceedings of the 37th Annual ACM Symposium on Theory of Computing, pages 494-503, 2005.], and instead exploits the combinatorial structure of the underlying unweighted graph. In the case of planar graphs, the graph is decomposed into O(n/k) pieces of size O(k), with each piece having a boundary of O(A) vertices. Then, a proper "miniature" (or "local") preconditioner is constructed independently for each of these pieces. The global preconditioner is the aggregation of the miniature preconditioners. Its quality will be bounded above by the quality of the worst among the miniature preconditioners.

Stated another way, the present invention relates to computational methods to solve systems of linear equations. The invention provides a method for decomposing the system, then applying preconditioners to the decomposed pieces in a manner which enables a solution of the system in linear time. More particularly, the invention solves systems of linear equations Ax=b, where A is the Laplacian matrix of a weighted planar graph with n nodes, through an algorithm that runs in time O(n). In addition, the algorithm is parallel. The availability of additional processors accelerates the algorithm by a factor that scales up with the number of processors. In the limit of its for parallelism, the algorithm can achieve a $O(n^{1/6})$ running time, which is possible when $O(n^{5/6})$ processors are available.

The objects of the present invention are achieved in general by providing computer methods for solving weighted planar graphs with O(n) work, in $O(n^{1/6})$ time. The method comprises five main steps, namely (1) decomposition of the graph; (2) construction of preconditioners for each piece in the decomposition ("miniature preconditioners"); (3) aggregation of the miniature preconditioners to obtain a global preconditioner; (4) construction of a hierarchy of preconditioners; and (5) solving of the weighted planar graph.

The first step, decomposition of the graph, comprises the use of parallel and sequential algorithms working locally to obtain a set of independent neighborhoods of the graph. After these operations, the graph is decomposed into edge-connected Voronoi regions, each corresponding to one of the independent neighborhoods. The graph is then further decomposed into Voronoi-Pair regions. These Voronoi-Pair regions are then either split using a separator algorithm such as Frederickson's algorithm [Greg N. Frederickson. Fast algorithms for shortest paths in planar graphs, with applications. SIAM J. Comput., 16(6):1004-1022, 1987.], or decomposed without another separator algorithm by re-using information computed through the previous steps. This results in a decomposition of the graph into pieces of size of at most O(k), each having O(√k) boundary nodes in average.

In the second step, preconditioners are constructed independently for each piece of the decomposition which was obtained through the first step. As these preconditioners are constructed individually for each piece, rather than applying a global preconditioner to the entire graph, they are referred to herein as "miniature preconditioners" or "local preconditioners". Various methods, can be utilized to construct these miniature preconditioners, including by example, without limiting the generality of the foregoing, the preconditioners of Spielman and Teng [Daniel A. Spielman and Shang-Hua Teng. Nearly-linear time algorithms for graph partitioning, graph sparsification, and solving linear systems. In Proceedings of the 36th Annual ACM Symposium on Theory of Computing, pages 81-90, June 2004.] or Steiner support trees [Keith Gremban. Combinatorial Preconditioners for Sparse, Symmetric, Diagonally Dominant Linear Systems. PhD thesis, Carnegie Mellon University, Pittsburgh, October 1996. CMU CS Tech Report CMU-CS-96-123.], [Bruce M. Maggs, Cary L. Miller, Ojas Parekh, P. Ravi, and Shan Leung Maverick Woo. Finding effective support, tree preconditioners. In Seventeenth ACM Symposium on Parallel Algorithms and Architectures, pages 176-185, Las Vegas, July 2005.].

Due to the computational efficiencies gained from the decomposition method of the first step, this approach enables the measurement of the quality of the local preconditioners while they are being constructed and prior to their application to the overall solution. Therefore, in one embodiment of the present invention, the second step includes the operations of testing the quality of the local preconditioner, through methods for the computation of generalized eigenvalues, such as those outlined in [G. H. Golub and C. F. Van Loan. Matrix Computations. The Johns Hopkins University Press, Baltimore, 3d edition, 1996.], followed by a possible substitution of better local preconditioners which are better for specialized instances.

In the third step, the miniature preconditioners are aggregated to construct a global preconditioner. Methods to accomplished this aggregation are known to those skilled in the art.

In the fourth step, a hierarchy of preconditioners is constructed. Through the recursive use of the Eliminate algorithm [Keith Gremban. Combinatorial Preconditioners for Sparse, Symmetric, Diagonally Dominant Linear Systems. PhD thesis, Carnegie Mellon University, Pittsburgh, October 1996. CMU CS Tech Report CMU-CS-96-123.] that comprises Gaussian elimination of nodes of degree one and two, the global preconditioner is used to generate a smaller graph, which in turn is used to generate a smaller global preconditioner, and iterated until the graph has a fixed or predetermined size.

In the fifth step, methods are used to solve the weighted planar graph. Specific examples of solution methods include Chebyshev and Conjugate Gradient iterations (see for example [James W. Demmel. Applied Numerical Linear Algebra. SIAM, 1997.]). Each iteration consists of a number of matrix/vector operations. Each of these operations can be executed in parallel. In one embodiment of the present invention, the parameters of the solving algorithm are adjusted accordingly to the quality of the local preconditioner measured through the second step.

The present invention can also include or be embodied as computer software, hardware, firmware, and combinations thereof which, when executed by a processor, causes the processor to perform certain actions according to the present invention. In one embodiment, the present invention includes a computer system, comprising a processor, memory, an input device, and an output device. The memory includes computer-readable instructions which, when executed, cause the processor to perform certain actions according to the present invention.

Many variations are possible with the present invention. These and other teachings, variations, and advantages of the present invention will become apparent from the following detailed description of the invention.

BRIEF DESCRIPTION OF THE SEVERAL VIEWS OF THE DRAWING

Embodiments of the present invention will now be described, by way of example only, with reference to the accompanying drawings for the purpose of illustrating the embodiments, and not for purposes of limiting the invention, wherein.

DETAILED DESCRIPTION OF THE INVENTION

Notation

The present invention will generally be described in terms of constructing multi-level solvers for planar graphs, and in methods and apparatuses for solving weighted planar graphs. The present invention, however, also has other applications. For example, the present invention may, to a certain extent, be applied to graphs which are not planar graphs, such as graphs with excluded shallow minors (such as is described in "Shallow Excluded Minors and Improved Graph Decompositions", published in Symposium on Discrete Algorithms, Proceedings of the fifth annual ACM-SAIM symposium on Discrete algorithms, 1994, by Plotkin, Smith, and Rao) that include graphs with small vertex separators and well shaped geometric meshes. For example, we consider the regular three dimensional weighted grid. This graph can be decomposed it into cubes of side k, each having $k^3$ nodes of which $k^2$ are interface nodes. This allows us to construct a global preconditioner by aggregating miniature preconditioners, as described below in steps 2 and 3. The successive application of Gaussian elimination and preconditioner construction can be continued as long as the graphs produced in the process continue to have small vertex separators. In cases more general than the regular three dimensional regular grid, the decomposition step can be performed by algorithms that work similarly to the algorithm for the decomposition of planar graphs into Voronoi regions. These and other variations and modifications are included within the scope of the present invention as described herein.

Figure 1:
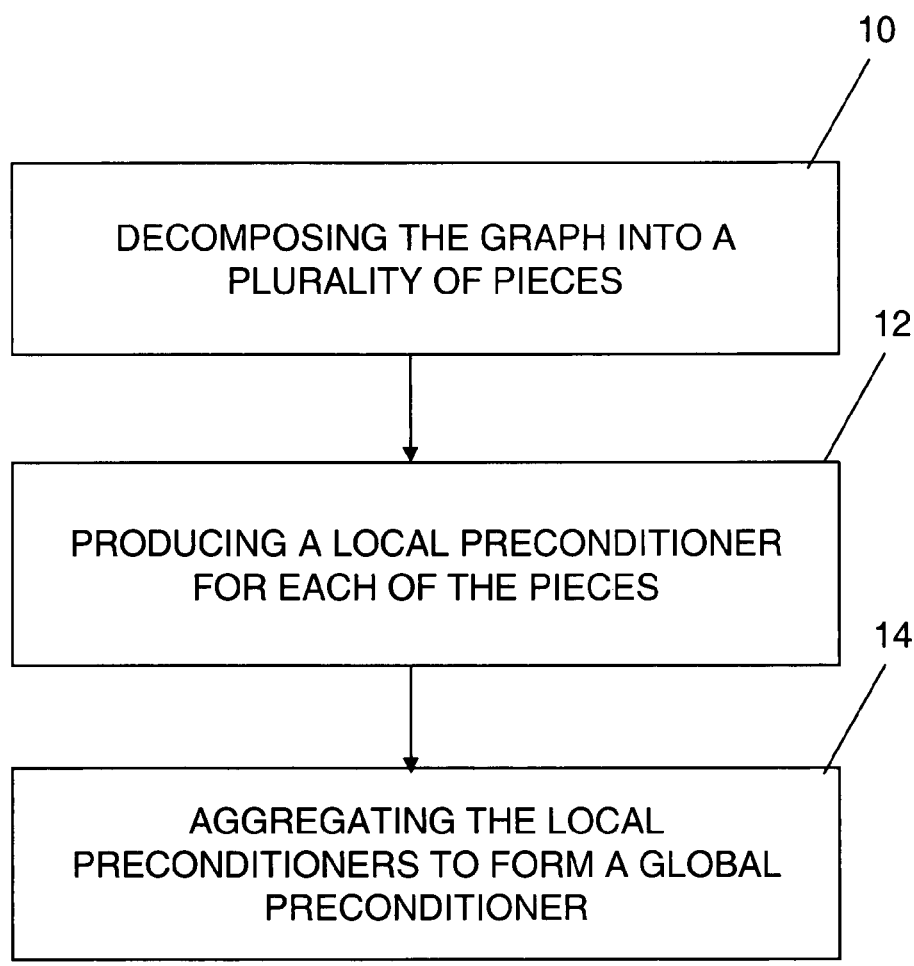
FIG. 1 illustrates one embodiment of a method according to the present invention.

FIG. 1 illustrates one embodiment of a method according to the present invention. The method includes three general steps: decomposing a graph into a plurality of pieces 10; producing a local preconditioner for each of the pieces 12; and aggregating the local preconditioners to form a global preconditioner 14. Each of the steps illustrated in FIG. 1 may include additional parts, and additional steps may be added to the method. For example, in the decomposing step 10, each of the pieces has a plurality of edges and a plurality of interface nodes, and the interface nodes in the graph are fewer in number than the edges in the graph. In addition, before producing a local preconditioner 12, the step of eliminating at least some of the nodes in the pieces may be performed. This elimination may include eliminating nodes having a degree greater than two, although nodes of degree two or one may also be eliminated in some embodiments. Many other variations are possible with the present invention, and several embodiments of the method and apparatus according to the present invention will now be described in more detail.

In general, the present invention relates to weighted planar graphs of the form $G=(V, E, w)$. An assumption is made that the given graph is connected and embedded, as those terms are defined in mathematics. An embedding can be found in linear time [John E. Hoperoft and Robert Endre Tarjan. Efficient planarity testing. J. ACM, 21(4):549-568, 1974.], and in at most $O(\log^2 n)$ parallel time, with parallel work ranging from $O(n \log \log n)$ to $O(n \log^2 n)$, depending on the parallel model [Vijaya Ramachandran and John H. Reif. Planarity testing in parallel. J. Comput. Syst. Sci., 49(3):517-561, 1994.], [Philip N. Klein and John H. Reif. An efficient parallel algorithm for planarity. J. Comput. Syst. Sci., 37(2):190-246, 1988.].

There is a natural isomorphism between graphs and their Laplacians. The Laplacian A of a graph G can be formed by letting $A(i, j)=-w_{ij}$ and $A(i,i)=\Sigma_{i \neq j} w_{ij}$. Conversely, given a Laplacian one can reconstruct the graph. For this reason, we will be identifying graphs with their Laplacians. For two Laplacians $A_1$ and $A_2$ corresponding to graphs $G_1=(V, E, w_1)$ and $G_2=(V, E, w_2)$, the graph that corresponds to $A_1+A_2$ is $G=(V, E, w_1+w_2)$. The quality of the preconditioner is measured by the condition number $\kappa(A, B)$ which is defined as the ratio $\lambda_{max}(A, B)/\lambda_{min}(A, B)$, where $\lambda_{max,min}(A, B)$ are the maximum and minimum non trivial generalized eigenvalues of the pair (A, B).

Let $A=(V, E)$ be a graph, and $V=\cup_{i=1}^{m} V_i$, with $A_i=(V_i, E_i)$ being the graph induced on $V_i$. Furthermore, assume that $E=\cup_{i=1}^{m} E_i$, and that every edge lies in at most two $A_i$. Let W be the "boundary" set of nodes that appear in at least two $V_i$'s, and $W_i = W \cap A_i$. We will call W a vertex separator that decomposes the graph into a plurality of pieces or components of size $\max_i |A_i|$. We call $\Sigma_{i=1}^{m} |W_i|$ the total boundary cost. Throughout the rest this document, we let k be any fixed constant. We will state the complexity of the algorithms as a function of k.

The present invention will generally be described in terms of a planar graph, using terms such as "boundary" with regard to the pieces or components. However, the present invention also has other applications, and the pieces or components may be thought of in more general terms as having a plurality of "edges" and "interface nodes". Accordingly, the vertex separator W mentioned above can be described as decomposing the graph into a plurality of pieces, wherein each of the pieces has a plurality of edges and a plurality of interface nodes. As will be described in more detail herein, according to at least one embodiment of the present invention, the interface nodes of the graph are fewer in number than the edges of the graph.

Planar Graph Decomposition

One aspect of the present invention is the method by which decomposition of the planar graph is accomplished. There is a considerable body of literature on linear work parallel algorithms for finding small vertex separators in planar graphs, including [Hillel Gazit and Gary L. Miller. A parallel algorithm for finding a separator in planar graphs. In 28th Annual Symposium on Foundations of Computer Science, pages 238-248, Los Angeles, October 1987. IEEE.]. However, these prior art algorithms and the underlying techniques are geared towards the construction of two-way separators. The fastest known algorithms for constructing a small n/k-way separator use variants of recursive bisection and run in time $O(n \log n)$ [Greg N. Frederickson. Fast algorithms for shortest paths in planar graphs, with applications. SIAM J. Comput., 16(6): 1004-1022, 1987.], [Marcos A. Kiwi, Daniel A. Spielman, and Shang-Hua Teng. Min-max-boundary domain decomposition. Theor. Comput. Sci., 261(2):253-266, 2001.]. The complexity of both algorithms is due to the computation of a full tree of balanced separators, spending O(n) time for the construction of each level of the tree.

We note that there is an O(n) time algorithm for constructing a full tree of separators for a planar graph [Michael T. Goodrich. Planar separators and parallel polygon triangulation. J. Comput. Syst. Sci., 51(3):374-389, 1995.]. However, the separators constructed in [Michael T. Goodrich. Planar separators and parallel polygon triangulation. J. Comput. Syst. Sci., 51(3):374-389, 1995.] are subtly different from the separators needed in [Greg N. Frederickson. Fast algorithms for shortest paths in planar graphs, with applications. SIAM J. Comput., 16(6):1004-1022, 1987.] or [Marcos A. Kiwi, Daniel A. Spielman, and Shang-Hua Teng. Min-max-boundary domain decomposition. Theor. Comput. Sci., 261(2):253-266, 2001.]. Furthermore, the algorithm of [Michael T. Goodrich. Planar separators and parallel polygon triangulation. J. Comput. Syst. Sci., 51(3):374-389, 1995.] requires the computation of a BFS tree for the graph. It is a long standing open problem whether a BFS tree can be computed with O(n) work in O(n) parallel time.

According to one embodiment of the present invention, the techniques of [Hillel Gazit and Gary L. Miller. A parallel algorithm for finding a separator in planar graphs. In 28th Annual Symposium on Foundations of Computer Science, pages 238-248, Los Angeles, October 1987. IEEE.] can be used to give a linear work parallel algorithm for decomposing any planar graph into connected components of size O(k), that are delimited by O(n/√k) boundary edges. Different techniques may be used in other embodiments of the invention. Another aspect of the present invention relies on the discovery that every planar graph with n nodes has a vertex separator W, that decomposes the graph into components of size O(k), with total boundary cost O(n/√k). The separator can be constructed in O(k log n) parallel time doing O(nk log$^2$ k) work in the CREW PRAM model, or in O(kn) sequential time. The decomposition enables the construction of preconditioner with the following guarantees:

Every planar graph A with n nodes has a subgraph preconditioner B such that: (i) $\kappa$(A, B)≤√k, (ii) if we apply Gaussian elimination on B by iteratively pivoting on degree one and two nodes only, we get a planar graph C with O(n log$^3$ k/√k) nodes. Given the decomposition herein described, the embedded graphs B, C can be constructed with O(n log$^2$ k) work, in O(k log n) parallel time.

In this section we disclose a method to partition a connected embedded planar graph G of size n into pieces of size at most O(k), by finding a set S of O(n/√k) edges that will be the boundaries of the pieces. Each boundary node is then incident to a number of pieces equal to the number of edges incident to it in S. Hence, the total cost of the boundary will be O(n/√k). The method is based on an algorithm of Gazit and Miller [Hillel Gazit and Gary L. Miller. A parallel algorithm for finding a separator in planar graphs. In 28th Annual Symposium on Foundations of Computer Science, pages 238-248, Los Angeles, October 1987. IEEE.]. It runs in O(k log n) parallel time, doing at most O(nk log$^2$ k) work.

Throughout this section we let $\overline{G}$ be a triangulation of G. Given the embedding, the triangulation can be computed easily with linear work in O(log n) time. Thus every edge in $\overline{G}$ is either an edge in G or an added edge. The separator will be the boundary between a partition of the faces of $\overline{G}$, consisting of O(n/√k) edges.

There are two natural graphs to define on the set of faces $\overline{F}$ of $\overline{G}$. The first is where we connect two faces if they share an edge, the geometric dual, denoted by $\overline{G}$*. In the second, the face intersection graph, we connect two faces if they share a vertex. Note that the face intersection graph is not in general planar, while the dual is planar. We say that a set of faces in $\overline{F}$ are edge/vertex connected if the corresponding induced graph in the geometric dual/face intersection graph is connected.

We define the vertex distance dist(f, f') between two faces f and f' to be one less than the minimum number of faces on a vertex connected path from f to f'. Since the faces are triangular, dist(f, f') is equal to the length of the shortest path from a vertex of f to a vertex of f', plus one. Thus two distinct faces that share a vertex are at vertex distance one. A d-radius vertex connected ball centered at a face f∈$\overline{F}$, denote $B_d$(f), is the set of all faces at distance at most d from f. That is, $B_d$(f)={f'∈ $\overline{F}$|dist(f, f')≤d}. By induction on the radius of the ball, one can show that a ball forms a set of edge connected faces.

We define the k-neighborhood of a face f∈$\overline{F}$ $N_k$(f) which consists of k faces as follows: (1) The ball $B_d$(f) where d is the maximum d such |$B_d$(f)|≤k. (2) The faces at distance d+1 from f are picked so that they form an edge connected set of faces, and $N_k$(f) remains edge connected and of size k.

We call faces at a given distance from f a layer and those at distance d+1 the partial layer. We define d+1 to be the radius of $N_k$(f). By definition, the boundary of the last full layer, is a simple cycle. Since the partial layer is edge connected to the last full layer, the boundary of $N_k$(f) is also a simple cycle.

For each face we construct its k-neighborhood. The neighborhood of a face f that is incident to a node v of degree at least k, will have only a partial layer. The partial layer can be constructed by taking the first k edges going in a clockwise fashion around v. In order to simplify our presentation, if a face is incident to more than one nodes of degree more than k, we will construct one k-neighborhood per each such node, as described above. So, a given face may generate up to three neighborhoods. The number of neighborhoods containing any given face is O($k^{log\ k+2}$).

The critical fact is that each k-neighborhood $N_k$(f) has a set $C_f$ of core faces. This leads to several understandings:

For each $N_k$(f) be a neighborhood of radius r, there exists a ball, B=$B_{r'}$(f) such that 2(r−r')+|∂B|≤√(2k)+4. We call $B_{r'}$(f) the core of $N_k$(f).

For each $N_k$($f_1$) and $N_k$($f_2$) that have at least one vertex in common and where P is any shortest path in $\overline{G}$ from the boundary of $f_1$ to the boundary of $f_2$, then the exposed part of P, that is the number of edges exterior to $C_{f1}$∪$C_{f2}$ is at most √(2k)+4.

With the above definitions of the neighborhoods and their cores, we can describe our methods to decompose the graph. We describe a method to find a set P of O(n/k) paths or incisions, with the following properties: (i) the removal of P disconnects the graph into pieces of size O(k), (ii) the two endpoints of each incision P E P are faces whose neighborhoods touch, so that the number of edges exterior to $C_{f1}$∪$C_{f2}$ is at most √(2k)+4. Then, for every incision P with end faces $f_1$, $f_2$, we include in the final separator S: (i) the boundaries of the cores $C_{f1}$ and $C_{f2}$, and (ii) the exposed part of P. One way to think of this, is that we first find the incisions, and then we add the cores of their end points on top of them. Finally, we return to the graph the interior of all the cores. It then becomes clear that the final separator decomposes the graph into pieces of size O(k). Furthermore, the number of edges added in S per incision, is at most 2(√(2k)+4). Hence, the total number of edges in the final separator is O(n/√k).

The algorithm to accomplish this decomposition proceeds as follows: The first step is to obtain a maximal set I of at most n/k face-disjoint neighborhoods 20 in $\overline{G}$. We call this the set of independent neighborhoods 20. The maximality of the set of independent neighborhoods 20 will provide a good "covering" of the graph 22, in the sense that the neighborhood 24 of every face exterior 26 to I, intersects at least one neighborhood 20 in I. This step is shown schematically in FIG. 2a. In the example illustrated in FIG. 2a, not all faces 26 are shown.

Figure 2:
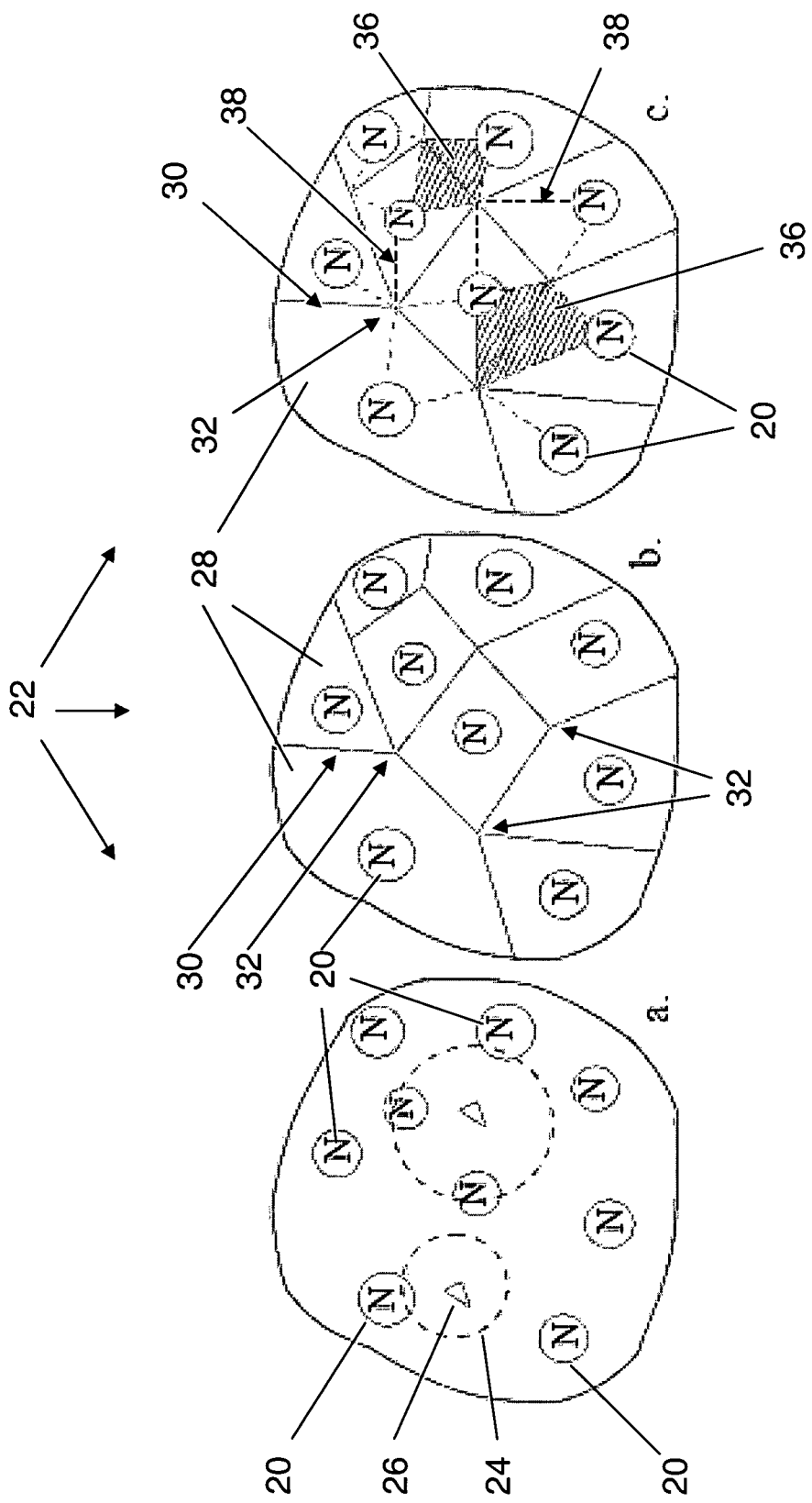
FIG. 2 illustrates steps of the algorithm according to one embodiment of the present invention.

In the second step, we assign each exterior face 26 to one of the neighborhoods 20 in I, in order to decompose the graph 22 into edge-connected Voronoi regions 28 of faces 26, each consisting of the faces 26 assigned to one neighborhood 20. This step is depicted in FIG. 2b. The edges 30 between the Voronoi regions 28 form a planar graph 22 that will be called the Voronoi boundary graph. The nodes 32 in the Voronoi boundary graph with degree greater than two will be called Voronoi nodes. The next step will be to further decompose the graph into Voronoi-Pair regions 36, by finding paths 38 between the neighborhoods 20 and the surrounding Voronoi nodes 32. Two of the Voronoi-Pair regions 36 are highlighted in FIG. 2c. Details are provided below. Finally, we separately split each Voronoi-Pair region 36, as described below.

Figure 3:
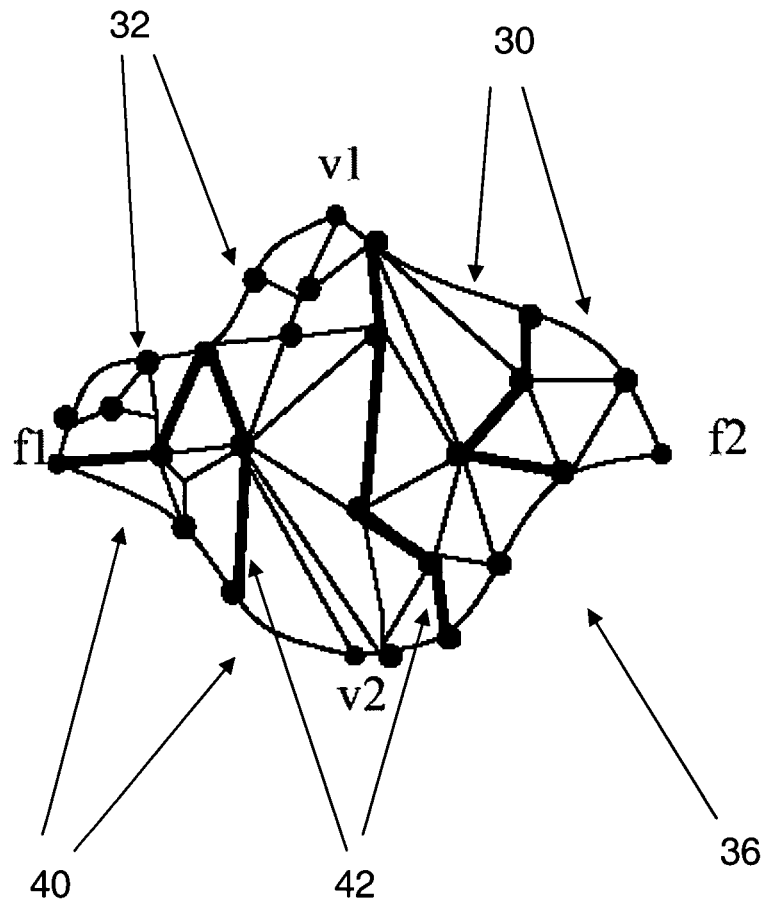
FIG. 3 illustrates pieces in a Voronoi-Pair region.

FIG. 3 illustrates pieces 40 in a Voronoi-Pair region 36, with the boundaries 42 of the pieces 40 shown with thicker lines. The edges 30 and nodes 32 are also illustrated. The Voronoi-Pair regions 36 are decomposed into pieces 40 as described herein.

Computing the Set of Independent Neighborhoods

We say that two neighborhoods are independent if they share no faces of F. Our approach is to compute a maximal set I of independent neighborhoods. This computation occurs in $O(k \log n)$ parallel time, doing $O(nk \log^2 k)$ work in the CREW PRAM model.

We denote with |G| the number of edges of a graph G. We define the containment graph $B_o$ to be the bipartite graph with the left side nodes corresponding to neighborhoods, and the right side nodes corresponding to faces. Any given neighborhood is joined with the k faces it contains. By construction, $|B_o| \leq 3kn$. We also define the neighborhood conflict graph $N(B_o)$, by letting nodes correspond to neighborhoods, and edges joining neighborhoods that intersect. Every neighborhood intersects with most $O(k^{\log k})$ neighborhoods. Thus $|N(B_o)| = O(k^{\log k} n)$.

To compute the maximal set I of independent neighborhoods, we use a modification of Luby's algorithm [Michael Luby. A simple parallel algorithm for the maximal independent set problem. SIAM J. Comput., 15(4):1036-1053, 1986.] which is summarized as follows: Assume that the input graph has n nodes. The algorithm consists of a number of rounds. The algorithm maintains an (initially empty) independent set I of nodes, which have been removed from the graph along with their neighbors. In every round: (i) Each node in the graph independently picks a random number in $(1, n^4)$. (ii) If a node has a bigger number than its neighbors, it joins I. (iii) The nodes that join the I and their neighbors remove themselves from the graph. The process continues until the graph is empty. Then, with high probability one round of the algorithm reduces the number of edges in the graph by a constant fraction. Thus the algorithm terminates with a Maximum Independent Set (MIS) after $O(\log n)$ rounds.

We now describe a simulation of the $t^{th}$ round of Luby's algorithm. Recall that we start with the set of neighborhoods that have not been removed from the graph, and their faces. We can as above define the current corresponding containment graph $B_t$ and the current neighborhood conflict graph $N(B_t)$.

The simulation will be done in k steps. At any step: (i) Each neighborhood is active or inactive. Initially, each neighborhood is active. If a neighborhood becomes inactive, it stays inactive for the rest of the round. (ii) Each face is owned by one neighborhood. Initially, one of the (up to) three neighborhoods that have a given center face owns it. The other two become inactive. (iii) Each face f keeps the value $v_f$ of the neighborhood that owns it, and each neighborhood keeps a list $L_N$ of the faces that it has owned during the previous steps.

Each neighborhood N picks a random number $v_N$ in $(1, n^4)$, and computes a BFS spanning tree of its geometric dual. The tree will be connected since the neighborhood is edge connected. At each step, each active neighborhood N picks one face f' from $L_N$, that is edge connected with a face f∉$L_N$, and f∈N. This is always possible since every neighborhood is edge connected, and it can be done in constant time using the BFS for N. Then N checks if it still owns f'. If not, N becomes inactive. If yes, N sends to f the value $v_N$ as a request to own f, and adds f to $L_N$. Note that at any point there will be only three neighborhoods that request from f to own it, so this step can be performed in constant time, without a concurrent write. So, f receives at most three neighborhood values, compares them with $v_f$ and keeps the largest, which becomes the new $v_f$. After the k steps are completed, every active neighborhood N reads the values of its faces, and if any face has value bigger than $V_N$, N becomes inactive. We are left with a set of still active neighborhoods each of which owns all its faces. Then, every one of these neighborhoods joins the I and marks its faces for deletion. All these writes are independent. Then, every neighborhood reads the values from its faces, and if it finds a face that has been marked for deletion, it removes itself from the containment graph $B_t$, and so it doesn't take part in the subsequent rounds of the algorithm. It is easy to see that the total work of the round is $O(|B_t|)$, and the parallel time complexity is $O(k)$.

The correctness of the algorithm follows from the fact that all the neighborhoods that remain active until the end are independent by construction. A neighborhood can become inactive only if it intersects a neighborhood with higher index. So, if a neighborhood has the biggest index among all the neighborhoods it intersects, it will stay active, and will join I. Thus the algorithm adds to I a superset of the neighborhoods that Luby's algorithm would add if run on $N_t(B)$. So with high probability we get a constant reduction $1/c$ of the number of edges of $N(B_t)$. Recall that $|N(B_o)| = O(k^{\log k} n)$, so for a proper $d = O(\log^2 k)$, $|N_o(B)|/c^{dk} = O(n)$. Also, it is clear that $|B_t| < |N(B_t)|$, and $|B_o| \leq 3kn$. Hence, the total work is:

$$\sum_{t=0} |B_t| = \sum_{t=0}^{dk} |B_t| + \sum_{t=dk+1} |B_t| \leq \sum_{t=1}^{dk} |B_0| + \sum_{t=dk+1} |N(B_0)|/c^{dk} c^{t-dk} = O(k \log^2 kn).$$

Decomposition into Voronoi Regions

After the step of computing the set of independent neighborhoods, the graph is then decomposed into edge connected Voronoi regions, each corresponding to one of the neighborhoods in I. At a high level, the natural approach is to find the nearest neighborhood of each exterior face f, and assign f to it. However, an exterior face may have several nearest independent neighborhoods. Simply breaking ties does not guarantee the edge connectedness of the Voronoi regions. We instead decompose faces that have more than one nearest neighborhood into more triangular faces, and then assign these new faces to neighborhoods.

If f is an exterior face and ∂N denotes the faces on the boundary of a neighborhood N, we then define dist(f, N)=$\min_{a \in \partial N}$dist(f, a), and dist(f)=$\min_{N \in I}$dist(f, N). If f is an exterior face of radius r, then r>dist(f). Also, if N(a)∈I is such that dist(f, N(a))=dist(f), then N(a) and N(f) share at least one vertex. Finally, if v is any vertex of f, every path that starts at v and has length at most dist(f)−1, is contained in N(f).

In the algorithm that follows, every exterior face f will compute a labeling of each of its vertices, of the form d[a], where d will be a distance, and a the index of a neighborhood in I. The labeling will be local, and so no concurrent writes are needed.

1. Recall that $\overline{G}$ is embedded and thus every vertex knows a clockwise arrangement of its edges. Given a root vertex v and an incident face f of reference, the left-most path between v and any vertex w is well defined. One can easily compute a "leftmost" BFS tree, that provides the leftmost shortest paths starting from v. For each neighborhood N(f), and every vertex v on the boundary of f, we compute the unique leftmost and rightmost BFS trees, rooted on v, with respect to f.

2. Each neighborhood $N(a) \in I$ marks all its faces with the index of a.

3. If a vertex v is on the boundary of some $N \in I$, it marks itself with 0 and submits clockwise the marks to its unmarked surrounding faces, so that the faces that receive the same mark are contiguous. This can be done in O(log n) time with O(n) total work. In this way, every exterior face f receives up to three marks through its vertices. If f receives a through vertex v, it labels v with 0[a]. Finally if f has received at least one mark, it labels with 1 each vertex that has not been marked with a 0.

4. To find the nearest neighborhood of an exterior face f, it is enough to consider the nodes in N(f) that are marked with 0. First, we label each vertex v of f with the distance of the 0 vertex nearest to v, plus one. This is by definition equal to dist(f). Let us call the vertices labeled with dist(f) critical for f. For each critical vertex v of f, we find the preferred path P, defined as the leftmost path that (i) starts in v, (ii) reaches a vertex w in a neighborhood $N \in I$, (iii) has length dist(f)−1. It is implicit that P is contained in N(f), and thus it can be found in O(k) time, by using the BFS computed in the first step. The face that lies anticlockwise (with respect to w) of the last edge of P has already labeled v with 0[a], for some a. Then, f labels $v_1$ with dist(f)[a].

Figure 4:
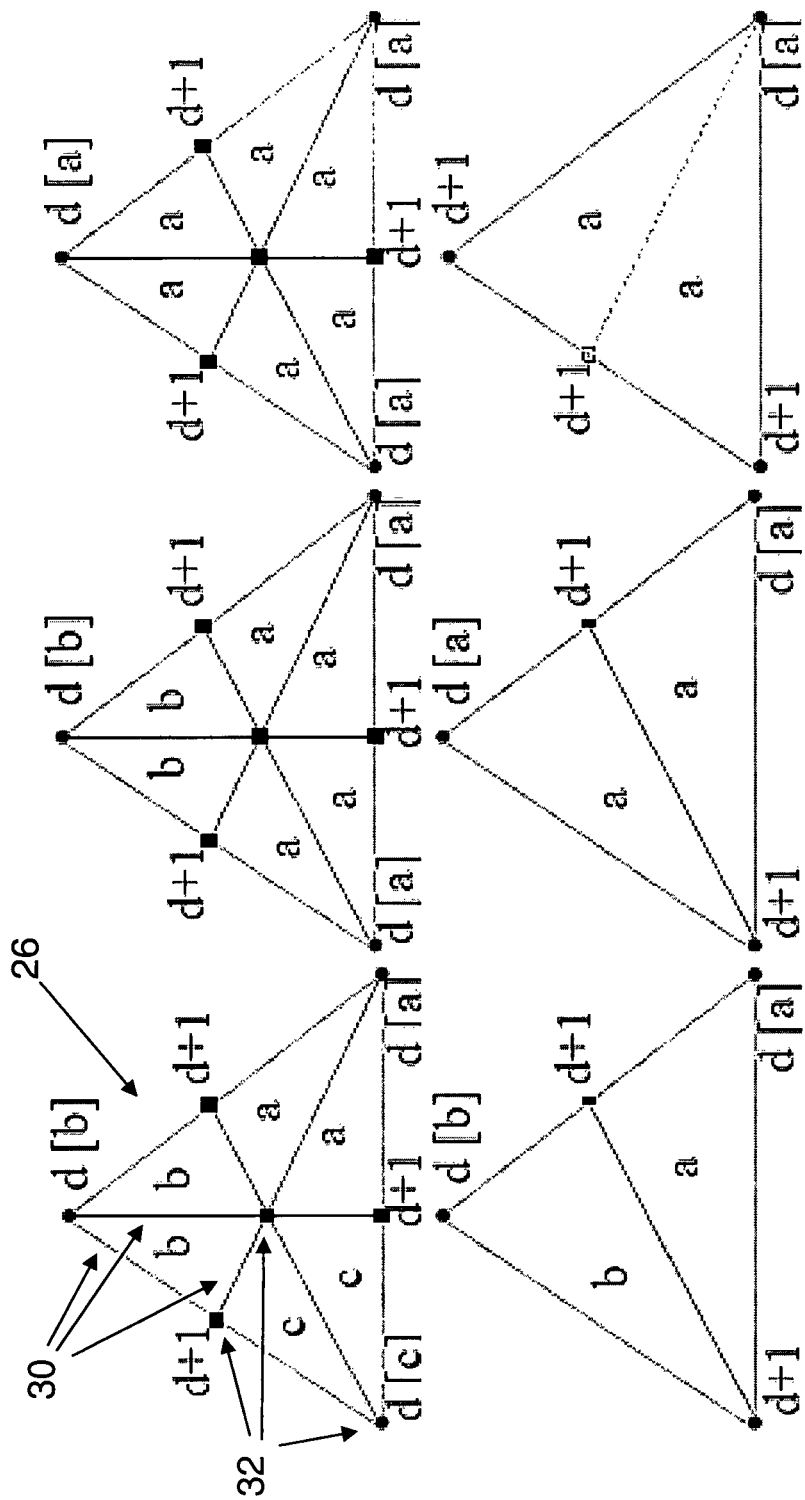
FIG. 4 illustrates breaking exterior faces according to one embodiment of the present invention.

5. Note that the distance labels computed for three vertices by the same face can differ by at most one. Then, one can verify that the exterior vertices can be classified to six different cases with respect to the type of labels that they have computed for their vertices. These cases are shown in FIG. 4. The base case (shown in the bottom right of FIG. 4) is when the exterior face has only one critical vertex. In each other case we introduce extra nodes and edges (shown as boxes in FIG. 4), so that every new face becomes a base case, and is marked with the corresponding nearest neighborhood. After splitting all the non-base faces (generating base faces in $\overline{G}'$), we split the base faces of $\overline{G}$ so that $\overline{G}'$ triangulated. This can be done without concurrent writes by having the faces communicate through the edges. We end up with a graph $\overline{G}'$, where every exterior face is triangular and has only one critical vertex.

All the faces assigned to a given neighborhood in $N(a) \in I$ will be called the Voronoi Region of a. The above construction produces Voronoi regions that are edge connected.

All the faces that share a vertex v compute the same distance label for v, which ensures that the last step of the algorithm is always possible. To see why, observe that every non-base case face splits into triangular faces. The graph will be triangulated if and only if an edge is split by both the faces that share it. A face splits its edges that join vertices with equal labels. So, two adjacent faces have both subdivided their common edge in Step 5, unless one of them is a base case face, which can be subdivided in the last step.

The set of preferred paths that reach a given $N \in I$ can be used to form a BFS spanning tree of the Voronoi region of N. We call this the preferred BFS tree of the Voronoi region.

Every node can find its ancestor and children in the tree in O(log n) time with O(n) work. Each Voronoi region contains $O(k^{\log k})$ faces.

Decomposition into Voronoi-Pair Regions

1 To simplify our notation, we denote $\overline{G}'$ by $\overline{G}$. Through the methods described above, the graph is decomposed into at most n/k Voronoi regions. Their boundaries are edges of $\overline{G}$. Despite the fact that these regions are edge-connected sets of faces, their boundaries may be not connected. In general, every connected region can be decomposed into a collection of simple boundary cycles, where the faces exterior to one cycle are edge-disjoint to those of another cycle. See [Gary L. Miller. Finding small simple cycle separators for 2-connected planar graphs. Journal of Computer and System Sciences, 32(3):265-279, June 1986. invited publication.] for a more complete discussion. Let C denote the set of boundary cycles of all the Voronoi regions. Any pair of boundary cycles in C, corresponding to different Voronoi regions, can share a path, a single vertex, or no vertices at all. We say that a cycle in C is non-trivial if it shares a path with at least one other cycle in C. The vertices where non-trivial cycles intersect have degree at least 3. We call these vertices the Voronoi nodes. Thinking of the simple paths between the Voronoi nodes as edges, we get a planar graph which we call the Voronoi boundary graph, denoted by $G_I$. The graph $G_I$ will not be in general connected when the regions have disconnected boundaries. We can think of $G_I$ as a set of connected components, where each but one connected component lies inside one face of another connected component. To see this formally, pick an arbitrary "outer" face $f_o$ of $\overline{G}$. To simplify our discussion we assume without loss of generality that the boundary of the region that contains $f_o$ is connected. Every region Vg has a unique external boundary cycle that lies closer to $f_o$. The faces enclosed by the boundary of each non-trivial internal cycle boundary of Vg form a connected component of G. This boundary is the outer face of a connected component $\overline{G}$, of $G_I$. Each of the other faces of G, correspond to the external boundary cycle of exactly one Voronoi region. It can be seen that the number of faces of $G_I$ is equal to the number of Voronoi regions that have a non-trivial external boundary.

Figure 5:
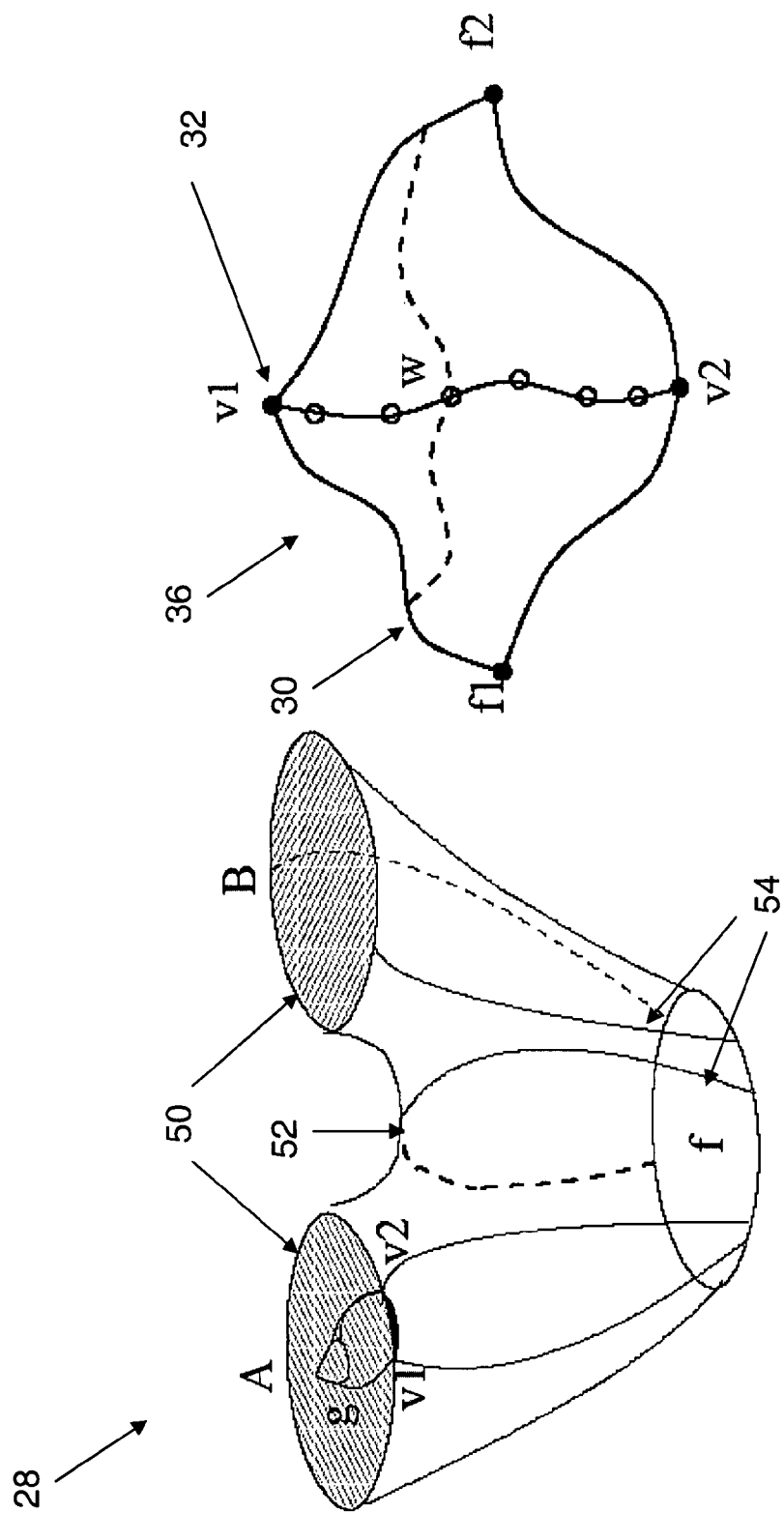
FIG. 5 illustrates a Voronoi region and a Voronoi-Pair region according to one embodiment of the present invention.

A topological picture of a Voronoi region 28 with a disconnected boundary 50 is shown in FIG. 5. Searching faces out from f, the boundary of $V_f$ is initially connected, until it reaches a saddle point 52, where it disconnects into two or more connected simple cycles. There are paths 54 from f to the saddle points 52 that form a collection of simple cycles and decompose $V_f$ into Voronoi subregions with simple cycle boundaries. Consider any given subregion $V_{fA}$. Any point on the boundary of $V_{fA}$ can be reached via a shortest path from f that lies in $V_{fA}$. Provided that we are given k≥3 vertices on the boundary of $V_{fA}$, we can decompose Vf, into k regions. The boundary of each of these smaller regions consists of one path on the boundary of $V_{fA}$, and two shortest paths from its endpoints back to f. So, any segment along the boundary between two different Voronoi regions 28 $V_f$, $V_g$, is reachable from both regions through shortest paths that lie inside the two subregions of $V_f$, $V_g$ that share the given cycle, as depicted in FIG. 5. This forms what we call a Voronoi-Pair region 36.

Based on the above discussion we construct the set P of incisions and the final separator S, as described above. First, for each Voronoi region 28 $V_f$ we add shortest paths from f to the saddle points 52. This decomposes $V_f$ into connected components with simple boundaries. Then, we pick three arbitrary vertices on every trivial cycle in C. Let $V_1$ be the set of those vertices, and $V_2$ be the Voronoi nodes 32. Finally, for each Voronoi region $V_f$ we add to P the shortest paths from f to each point of its boundary which is in $V_1 \cup V_2$. There are at least two such points on each boundary cycle, and each Voronoi subregion is decomposed into half-Voronoi pairs. Those are coupled with half-Voronoi pairs inside the adjacent region $V_g$, and thus the graph is decomposed into Voronoi-Pair regions 36. The number of paths added to P is at most 6n/k.

At the end of the previous section, every edge 30 knows on which boundary it lies, and can compute its neighboring edges on it. Then, every boundary component between two Voronoi regions 28 can decide if it is a trivial cycle or a segment with two endpoints. If it is a trivial cycle, it arbitrarily breaks itself in three segments. For the computation of the shortest paths between say, f and $v_1$, $v_2$ in FIG. 5, we will use the preferred BFS tree of the Voronoi region of f. By construction, the earlier established property that the exposed part of P, that is the number of edges exterior to $C_{f_1} \cup C_{f_2}$ is at most $\sqrt{(2k)}+4$ applies to those paths. So, each path in P, and the corresponding exposed part in S can be computed easily, and will be marked. It is not hard to see that all the required computations can be done in O(log n) time with O(n) work.
Splitting the Voronoi Pairs Various methods can be used to split Voronoi Pairs. If $\mathcal{V}$ denotes the set of Voronoi-Pair regions, then the size of each $V \in \mathcal{V}$ is bounded by $O(k^{\log k})$. We can run Frederickson's algorithm [Greg N. Frederickson. Fast algorithms for shortest paths in planar graphs, with applications. SIAM J. Comput., 16(6):1004-1022, 1987.] on the geometric dual of each V, to add to the separator $O(|V|)/\sqrt{k}$ edges that disconnect V into pieces of size O(k). The total number of edges added to S will be $\Sigma_{V \in \mathcal{V}} O(|V|)/\sqrt{k} = O(n/\Sigma k)$. The total work will be $\Sigma_{V \in \mathcal{V}} O(|V| \log |V|) \leq n \log^2 k$. The algorithm can be run independently on each V, so the parallel time is $O(k^{\log k})$ Alternatively, we can decompose the Voronoi pairs without invoking another separator algorithm. For example, if $V_f$ and $V_g$ are the two Voronoi regions in the pair, and $T_f$, $T_g$ are their preferred BFS trees, then for a given segment between two vertices $w_1$, $w_2$ of the boundary, we define the weight of $[w_1, w_2]$ to be the total number of the nodes contained between the paths from $w_1$, $w_2$ to their common ancestors, in $T_f$ and $T_g$ respectively. We decompose the boundary into non-overlapping segments, such that: (i) every segment consisting of one edge has weight larger than 2k, (ii) every segment of weight less than k lies between two segments of weight larger than k, (iii) all other segments have weight between k and 2k. Let $V_3$ be the set of the endpoints of these segments. We add to P the shortest paths from the vertices in $V_3$ to f and g. Since the diameter of the trees is O(k), this decomposition can be done in O(k+log n) time with linear work. The total number of paths added to P is O(n/k), by construction. We are left with the segments consisting of only one edge, whose weight can be up to $O(k^{\log k})$. Let M be the component defined by one such segment. We separately focus on each half of M. As implied by the fact that the Voronoi regions are connected, along with the preferred BFS $T_M$, we have implicitly computed a preferred spanning tree $T^*_M$ of the geometric dual of M. The paths of faces in $T^*_M$ lie along paths of $T_M$, by construction. We will use parallel tree contraction, to find the k-critical nodes of $T^*_M$ in O(k) time, with $O(|T^*_m|)$ work (see [Margaret Reid-Miller, Gary L. Miller, and Francesmary Modugno. List ranking and parallel tree con-traction. In John Reif, editor, Synthesis of Parallel Algorithms, pages 115-194. Morgan Kaufmann, 1993.] for definitions and details). The number of critical nodes is O(|M|/k). We will add to S the faces corresponding to the critical nodes. This will decompose M into O(|M|/k) pieces (called in [Margaret Reid-Miller, Gary L. Miller, and Francesmary Modugno. List ranking and parallel tree con-traction. In John Reif, editor, Synthesis of Parallel Algorithms, pages 115-194. Morgan Kaufmann, 1993.] the k-bridges) of size at most O(k). The vertices contained in each of these bridges are delimited by three paths in $T_M$. We will add these paths to P. The total number of paths added to P in this step is O(n/k) and the total work is O(kn).

Other methods could alternatively be used to split or decompose the Voronoi-Pairs.

9.3 Constructing the Miniature Preconditioners

After the completion of the decomposition or partitioning of the graph through the methods described above, we construct preconditioners to individually apply to the decomposed pieces, which we refer to as "miniature preconditioners" or also as "local preconditioners". In other words, according to one embodiment, a miniature preconditioner is produced for each of the pieces. An appealing characteristic of the miniaturization approach is the fact that it disconnects the problem of the existence of a good preconditioner from its construction. In one embodiment of the present invention, we use the preconditioners of Spielman and Teng for the construction of the miniature preconditioners. However, we note that we can substitute them entirely with the Steiner support trees introduced in [Keith Gremban. Combinatorial Preconditioners for Sparse, Symmetric, Diagonally Dominant Linear Systems. PhD thesis, Carnegie Mellon University, Pittsburgh, October 1996. CMU CS Tech Report CMU-CS-96-123.] and analyzed in [Bruce M. Maggs, Cary L. Miller, Ojas Parekh, P. Ravi, and Shan Leung Maverick Woo. Finding effective support, tree preconditioners. In Seventeenth ACM Symposium on Parallel Algorithms and Architectures, pages 176-185, Las Vegas, July 2005.], affecting only the hidden constant in the total work of the algorithm. Steiner trees are usually better than low sketch trees in practice, and provably better for many natural families of graphs [Gary L. Miller and Peter C. Richter. Lower bounds for graph embeddings and combinatorial preconditioners. In Proceedings of the sixteenth Annual ACM Symposium on Parallel Algorithms, pages 112-119, 2004.], [Bruce M. Maggs, Cary L. Miller, Ojas Parekh, P. Ravi, and Shan Leung Maverick Woo. Finding effective support, tree preconditioners. In Seventeenth ACM Symposium on Parallel Algorithms and Architectures, pages 176-185, Las Vegas, July 2005.]. A major obstacle in their applicability as preconditioners was that the algorithm for their construction is polynomial in the size of the graph. This is no longer a problem.

The increased hidden constant in the construction of the preconditioner may actually be desirable. In most applications, one is interested in solving many linear systems with a given Laplacian. The preconditioners depend only on the given graph, hence they are constructed a single time. In those situations, it makes sense to spend more time on the construction of the preconditioners. This is because their quality affects the running time for every system that is solved; and therefore to guarantee fast convergence, the solver must do a certain number of iterations. Otherwise the convergence can be arbitrarily slow. Apart from the extra time for the design of the miniature preconditioner, one can also spend extra time on measuring its quality. With a global preconditioner, one has to assume the worst case theoretical guarantee for the quality of the preconditioner. This guarantee may be too pessimistic, but there is no way to decide quickly if this is indeed the case. In our approach, the actual quality can be measured easily, and the corresponding parameters in the solver can be adjusted accordingly. Testing the quality of the preconditioner is also useful when a fast algorithm for constructing the preconditioner is good on typical instances, but may occasionally fail, as it is the case with algorithms for constructing Steiner trees.

Failure instances can be detected, and the more expensive accurate algorithm will be run only on them.

Various preconditioners can be used to construct the miniature preconditioners, for example the following preconditioner of Spielman and Teng [Daniel A. Spielman and Shang-Hua Teng. Nearly-linear time algorithms for graph partitioning, graph sparsification, and solving linear systems. In Proceedings of the 36th Annual ACM Symposium on Theory of Computing, pages 81-90, June 2004.]:

Let $\mathcal{A}=\{A_i\}$ be the components of the partition, and $W_i=A_i \cap W$. We have $\Sigma_i |W_i|=O(n/\sqrt{k})$, and thus $\Sigma_i|A_i|=O(n)$. Every edge of A is contained in at least one $A_i$, and in at most two; if it is contained in two, each cluster gets half of its weight. In this way, we get $A=\Sigma_i A_i$. We let $B_i$ be the subgraph of $A_i$ that satisfies $|B_i|=|A_i|-1+|A_i|O(\log^3 k/\sqrt{k})$, and $\kappa(A_i, B_i)=\sqrt{k}$. The preconditioner will be $B=\Sigma_i B_i$ and we get $\kappa(A, B)=\sqrt{k}$.

In other embodiments of the present invention, other preconditioners are used, including, but not limited to Steiner support trees [Keith Gremban. Combinatorial Preconditioners for Sparse, Symmetric, Diagonally Dominant Linear Systems. PhD thesis, Carnegie Mellon University, Pittsburgh, October 1996. CMU CS Tech Report CMU-CS-96-123.], [Bruce M. Maggs, Cary L. Miller, Ojas Parekh, P. Ravi, and Shan Leung Maverick Woo. Finding effective support, tree preconditioners. In Seventeenth ACM Symposium on Parallel Algorithms and Architectures, pages 176-185, Las Vegas, July 2005.].

Due to the computational efficiencies gained from the decomposition methods described above, this approach enables the measurement of the quality of the preconditioners while they are being constructed and prior to their application to the overall solution. Therefore, in one embodiment of the present invention, the process of constructing and applying preconditioners includes the operations of testing the quality of the preconditioner, through methods for the computation of generalized eigenvectors, such as [G. H. Golub and C. F. Van Loan. Matrix Computations. The Johns Hopkins University Press, Baltimore, 3d edition, 1996.], followed by a possible substitution of better preconditioners which are better for specialized instances.

9.4 Construction of a Global Preconditioner

The construction of a global preconditioner involves the aggregation of the miniature preconditioners. Briefly, it is noted that there is a 1-1 correspondence between graphs and Laplacians. Using the decomposition of the graph, we can write A as a sum of "miniature" Laplacians/graphs $A=A_1+A_2+\ldots$. Then we construct the miniature preconditioner $B_i$ for each $A_i$. The global preconditioner for A will be $B=B_1+B_2+\ldots$. In other words aggregation is the sum of the preconditioners' Laplacians.

9.5 Construction of a Hierarchy of Preconditioners

Following the construction of a global preconditioner, we proceed with the construction of a hierarchy of preconditioners as a prelude to solving the graph. Through the recursive use of the Eliminate algorithm [Keith Gremban. Combinatorial Preconditioners for Sparse, Symmetric, Diagonally Dominant Linear Systems. PhD thesis, Carnegie Mellon University, Pittsburgh, October 1996. CMU CS Tech Report CMU-CS-96-1231 or [Daniel A. Spiehnan and Shang-Hua Teng. Solving Sparse, Symmetric, Diagonally-Dominant Linear Systems in Time 0(nar.31). In FOGS '03: Proceedings of the 44th Annual IEEE Symposium on Foundations of Computer Science, page 416. IEEE Computer Society, 2003.], the global preconditioner is used to generate a smaller graph, which in turn is used to generate a smaller global preconditioner with fewer nodes, and iterated until the graph has a fixed size, which is a small constant, that is independent from n. In a possible implementation, it may be more practical to stop iterating when the graph becomes a small function of n, such as $n^{1/3}$. Other values of n (or other predetermined graph sizes at which the iteration ceases) may also be used, depending on the particular application and performance desired.

To accomplish the construction of this hierarchy, we remove degree one and two nodes in the interior of each $A_2$ independently, using the Eliminate algorithm. Concretely, we let $C_i$=Eliminate($B_i$, $W_i$) and $C=\Sigma_i C_i$.

This will provide a partial Cholesky factorization of B=L $[1, 0; 0, C]L^T$. Through the use of the Eliminate algorithm, we have $|C_i|\leq 4(|W_i|+|A_i|\log^3 k/\sqrt{k})$, and $|C|\leq\Sigma_i|C_i|=O(n \log^3 k/\sqrt{k})$.

Each $B_i$ can be constructed independently in time $O(|A_i|\log^2 k)$. Hence, the total work for the construction of B is $\Sigma_i (|A_i|\log^2 k)=O(n \log^2 k)$. Since A, B are embedded, C comes automatically embedded.

So, far we have described an algorithm PreC, which takes as input a graph A, and returns two graphs B, C. We denote this, by (B, C)=PreC(A). Now, we make a change of symbols to conform with the literature, as we are no longer discussing the miniature graphs. We use $A_i$, $B_i$ to conform with the literature, where $A_0$ represents the original graph. To construct the hierarchy we will execute the following sequence: $(B_0, A_1)$=PreC$(A_0)$, $(B_1, A_2)$=PreC$(A_1)$, $(B_2, A3)$=PreC $(A_2), \ldots, (B_1, A_{i+1})$=PreC$(A_i)$.

In other words, we recursively construct the hierarchy of $A_0, B_0, A_1, B_1, A_2, B_2, \ldots$. For all i, $A_i$ and $B_i$ have the same number of nodes, but $B_i$ has many degree 1 and 2 nodes, and it can be reduced to $A_{i+1}$ after applying the Eliminate algorithm.

9.6 Solving the Planar Graph

Following the completion of the steps described above, the weighted planar graph can be solved. As noted above, the parameters of the solution can be adjusted to adapt to the results of quality tests on the miniature preconditioners.

With A representing a graph with n nodes, an approximate solution for the system is sought such that Ax=b, so that $\|x-\bar{x}\|\leq\frac{1}{2}$. Given an approximate solution $x_i$, one Chebyshev iteration ([James W. Demmel. Applied Numerical Linear Algebra. SIAM, 1997.]) obtains a better approximation $x_{i+i}$. The preconditioned Chebyshev iteration ([James W. Demmel. Applied Numerical Linear Algebra. SIAM, 1997.]), is the Chebyshev iteration applied to the system $B^{-1}Ax=B^{-1} b$. Each iteration uses only matrix-vector products of the form $B^{-1}z$, which is the solution of the system By=c. It is known that $O(\sqrt{(\kappa(A, B))}$ Chebyshev iterations guarantee the required approximation, provided that the products $B^{-1}z$ are computed exactly.

In the present invention, the preconditioner matrix B is a Laplacian. Let $A_1$ be the output of algorithm Eliminate, run on input (A, Ø). The partial Cholesky factorization of B gives $B=L[I, 0; 0, A_1]L^T$, where L is a lower triangular matrix with $O(n)$ non-zero entries. One can solve By=c, by solving for z in $[I,0; 0, A_1]z=L^{-1}c$, and then computing $y=L^{-T}z$ by back-substitution. Therefore, we can solve a system in B by solving a linear system in $A_1$ and performing $O(n)$ additional work.

However $A_1$ is itself a big graph. Naturally, we can recursively perform preconditioned Chebyshev iterations on $A_1$, with a preconditioner B. This is how the hierarchy of graphs $A=A_0, B_0, A_1, B_1 \ldots, A_r$, constructed through the previous step is used. In [Daniel A. Spielman and Shang-Hua Teng. Nearly-linear time algorithms for graph partitioning, graph sparsification, and solving linear systems. In Proceedings of the 36th Annual ACM Symposium on Theory of Computing, pages 81-90, June 2004.] it was shown that the following recursive algorithm obtains the required approximation:

Solve[$A_i$, b]: If i=r return $A_r^{-1}$b. Otherwise, perform $5\sqrt{(\kappa(A_i, B_i))} \ln \kappa(A_i, B_i)$ Chebyshev iterations, with preconditioner $B_i$. Each time a product $A^{-1}_{i+1}$c is needed, use Solve [$A_{i+1}$, c] instead. Return the last iterate.

The benefits of the present invention will be recognized in the ability of the algorithm to be performed sequentially and in parallel. With regard to sequential processing, let, $5\sqrt{(\kappa(A_i, B_i))} \ln \kappa (A_i, B_i) \le t$, and $|A_i|/|A_{i+1}| \le m$, for all i. If $|A_r|$ be a constant, then the corresponding systems are solved in constant time. By an easy induction, the total number of calls to Solve with input $A_i$, is $t^i$. For each call of Solve at level i, the amount of work is $O(t|A_i|)=O(tn/m^i)$. Assuming that the sequence of graphs can be constructed in time T, if $t/m<\frac{1}{2}$, the total amount of work is $T+O(tn \Sigma_i(t/m)^i)=O(T+tn)$. We can pick a value k that satisfies $t/m=\frac{1}{2}$ for a constant t. The time to construct the hierarchy is $T=\Sigma_i O((k+\log^2 k)n/m^i)=O(kn)$. In comparison, using the construction of [Daniel A. Spielman and Shang-Hua Teng. Nearly-linear time algorithms for graph partitioning, graph sparsification, and solving linear systems. In Proceedings of the 36th Annual ACM Symposium on Theory of Computing, pages 81-90, June 2004.], the least t for which $t/m=\frac{1}{2}$ can be achieved, is $O(\log^2 n \log \log n)$.

Let us now turn our attention to the potential for parallelism in algorithm Solve. The hierarchy of graphs can be constructed with $O(nk \log^2 k)$ work in $O(k \log^2 n)$ time. At any point of time, the total memory needed by the algorithm is $O(n)$, since for each i we need to store a graph of size $O(n/t^i)$ and a constant number of vectors of size $n/t^i$. One Chebyshev iteration consists only of a constant number of sparse matrix-vector multiplications and vector additions. Using n processors, the vector operations can be performed in time $O(1)$, and the matrix-vector multiplication in time $O(\log n)$ with work linear in the size of the vector. Both the sequential and the parallel algorithms will make the same number of Chebyshev iterations, and thus the total parallel work is proportional to the total sequential work.

The Chebyshev iterations have to be performed sequentially, so the dominating factor in the time complexity of the parallel algorithm is the total number of Chebyshev iterations which is dominated by the $O(t^r)$ iterations done at the bottom of the hierarchy. Let $m=t^c$. Given that $|A_r|$ is constant, we have $r \le \log_m n$, and $t^r=O(n^{1/c})$. The algorithm of Spielman and Teng can achieve a c arbitrarily close to 2, though at the expense of the total work done by the algorithm. For example, ignoring log log n terms, if we set $n/m=\log^8 n$, we get $t=\log^4 n$ and $m=\log^6 n$, thus $c=\frac{3}{2}$. Observe that the parallel time complexity is up to a polylog(n) factor equal to $n^{1/c}$ even when we use nearly $n^{1-1/c}$ processors. Since the embedded graphs B,C can be constructed with $O(n \log^2 k)$ work in $O(k \log n)$ parallel time, then c can be taken arbitrarily close to 2, while the total work remains $O(n)$ with only a larger hidden constant.

We can improve the number of Chebyshev iterations while keeping the amount of work linear, by stopping the recursion at a higher level. For simplicity, in the following discussion we omit inverse polylogarithmic factors in the size of $A_r$, and polylogarithmic factors in the parallel time complexity. Let $|A_r|=n^\alpha$. We have $r=(1-\alpha) \log_k n$, and $t^r=n^{(1-\alpha)/c}$. To solve the systems in A, we will use the parallel nested dissection algorithm of Pan and Reif [Victor Y. Pan and John H. Reif. Fast and efficient parallel solution of sparse linear systems. SIAM J. Comput., 22(6):1227-1250, 1993.]. The algorithm requires as input a tree of small vertex separators for $A_r$. This can be constructed one time, with o(n) work, and in $n^{(1-\alpha)/c}$ time using Klein's algorithm [Philip N. Klein. On Gazit and Miller's parallel algorithm for planar separators: Achieving greater efficiency through random sampling. In SPAA, pages 43-49, 1993.]. Then, the algorithm obtains a one-time factorization of $A_r$ in polylog(n) time, with $O(n^{3\alpha/2})$ work, which is linear if $\alpha=\frac{2}{3}$. Then, every system in $A_r$ can be solved in polylog(n) time, with $O(n^\alpha)$ work. The total amount of work for solving the systems in $A_r$, is $O(n^{(1-\alpha)/c} n^\alpha)=o(n)$. Hence the parallel time complexity approaches $O(n^{1/6})$ as c approaches 2, and the algorithm can use only $O(n^{5/6})$ processors.

The present invention may be embodied in various apparatuses. For example, the present invention may be embodied as computer software, hardware, firmware, and combinations thereof, or any other form of computer-readable media which, when executed by a processor, cause the processor to perform certain functions, as described herein. For example, the present invention may be embodied entirely as computer software or other form of computer-readable instructions in any media or form, and which may be used and moved in a wide variety of apparatuses and applications or which may be isolated or localized to one or a small number of apparatuses or applications. The present invention may also be embodied in a larger apparatus, such as a computer or a computer system. For example, the present invention may be integrated into a larger apparatus or system such as, for example, with embedded software, hardware, and firmware. The present invention also has many applications. For example, the present invention may be used in medical applications, such as in the registration and segmentation of three dimensional OCT scans in opthalmology, and three dimensional mammograms.

The present invention may also be used in other applications, such as real-time object tracking, as well as in the solution of certain partial differential equations using finite element discretizations.

Figure 6:
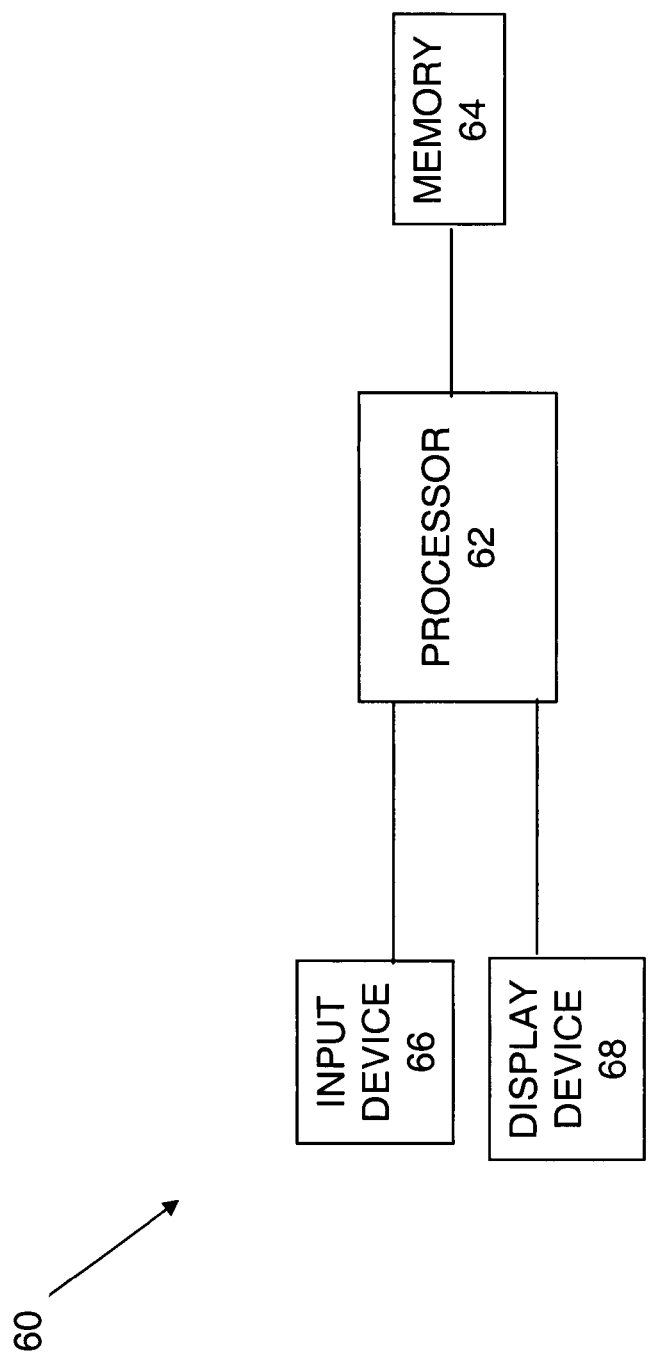
FIG. 6 illustrates one embodiment of a system according to the present invention.

FIG. 6 illustrates one embodiment of a system 60 according to the present invention. In that embodiment, the system 60 includes a processor 62, memory 64, an input device 66, and an output or display device 68, such as a monitor. The processor 62 is connected to the memory 64, the input device 66, and the output device 68. The memory 64 includes computer readable instructions, such as computer hardware, software, firmware, or other forms of computer-readable instructions which, when executed by the processor 62, cause the processor 62 to perform certain functions, as described herein.

In particular, the system identifies data indicative of a graph. The term "identifies" is used broadly and means that the data indicative of the graph is provided to or accessed by the system 60. In other words, the system is able to use the data to perform the tasks described herein. This data may be provided to the system 60 via the input device 66, the data may be preloaded in the memory 64 and accessed by the system 60 at an appropriate time, or the data may be provided to and identified by the system 60 by some other means. After identifying the data indicative of the graph, the system 60 may operate on the data and the graph as described herein. For example, after identifying the data indicative of the graph, the system 60 may decompose the graph into a plurality of pieces, produce a local preconditioner for each of the pieces, and aggregate the local preconditioners to form a global preconditioner, as described herein. As a further example, the input of the algorithm is a matrix A, and a vector b. The output is the vector x for which Ax=b. The user (or computer software) stores in the memory 64 the positions and values of the non-zero entries of A and b, in some pre-agreed format. The processor 62 will read A, b from the memory 64 and store x in the same or a different part of the memory 64. Other software can operate on x according to the user's particular needs and as described herein.

The processor 62 receives input from the input device 66, and provides signals to control the output device 68. The processor 62 also performs certain functions, as described herein.

The memory 64 can be any for of computer-readable memory, and may store information in magnetic form, optical form, or other forms. The memory includes computer readable instructions which, when executed by the processor 62, cause the processor 62 to perform certain functions, as described herein. The memory 64 may be separate from the processor 62, or the memory 64 may be integrated with the processor 62. The memory 64 may also include more than one memory device, which may be integrated with the processor 62, separate from the processor 62, or both.

The input device 66 may be a keyboard, a touchscreen, a computer mouse, or other forms of inputting information from a user.

The output device 68 may be a video display or other forms of outputting information to a user.

Many variations are possible with the system 60 according to the present invention. For example, more than one processor 62, memory 64, input device 66, and output device 68 may be present in the system 60. In addition, devices not shown in FIG. 6 may also be included in the system 60, and devices shown in FIG. 6 may be combined or integrated together into a single device, or omitted.

Thus there has been described herein a concept, as well as a preferred embodiment, of a method and system which is used to solve weighted planar graphs. Because the various embodiments of the methods and systems as herein-described utilize decomposition methods which partition the graph into components of size $O(k)$, and the preconditioning methods are applied to the individual components of the graph, the overall graph can be solved in linear sequential time and in $O(n^{1/6})$ parallel time which allows a vast improvement in terms of computational speed.

Although the present invention has generally been described in terms of weighted planar graphs, and in terms of specific embodiments and implementations, the present invention is applicable to other methods, apparatuses, systems, and technologies. For example, the present invention is also applicable to graphs with small vertex separators, including well formed d-dimensional meshes. In addition, the examples provided herein are illustrative and not limiting, and other variations and modifications of the present invention are contemplated, such as by the application of Gaussian elimination on vertices of degree higher than two and application of Gaussian elimination steps within the pieces, before the construction of the miniature preconditioner. Those and other variations and modifications of the present invention are possible and contemplated, and it is intended that the foregoing specification and the following claims cover such modifications and variations.

The invention claimed is:

1. A method for constructing a multi-level solver for a linear system, the method comprising the steps of:
   a. providing a processor to execute the following steps of the method;
   b. decomposing a planar graph A of the linear system into a plurality of pieces, wherein each of the pieces has a plurality of edges and a plurality of interface nodes that are fewer in number than the edges;
   c. producing a local preconditioner for each of the pieces of the planar graph A;
   d. producing a planar global preconditioner graph B of the planar graph A by aggregating the local preconditioners;
   e. generating a planar graph C based on the planar global preconditioner B of the planar graph A, wherein the planar graph C is smaller than the planar graph A;
   f. substituting the planar graph A with the planar graph C;
   g. iterating between steps b-f until the planar graph C reaches a predetermined size to generate a sequence of graph A, global preconditioner graph B, and graph C to form a preconditioning hierarchy, wherein the planar graph A has an iteration count, wherein the global preconditioner graph B has an iteration count, wherein the iteration count of the planar graph A is the same as the iteration count of the global preconditioner graph B, wherein the planar graph C is smaller than the planar graph A, wherein the planar graph C has an iteration count; and
   h. applying the preconditioning hierarchy to a recursive preconditioned iterative method to solve the linear system.

2. The method of claim 1, wherein the step of decomposing the planar graph A includes:
   constructing a set of independent neighborhoods; and
   decomposing the planar graph A into edge-connected Voronoi regions, wherein each of the edge-connected Voronoi regions corresponds to one of the independent neighborhoods.

3. The method of claim 2, wherein the step of decomposing the planar graph A includes decomposing the edge-connected Voronoi regions into Voronoi-Pair regions.

4. The method of claim 2, wherein the step of decomposing the planar graph A into the set of independent neighborhoods includes using parallel and sequential algorithms working locally to produce the set of independent neighborhoods of the planar graph A.

5. The method of claim 1, further comprising the step of eliminating at least one node in the pieces of the planar graph A before producing the planar global preconditioner graph B of the planar graph A.

6. The method of claim 5, wherein the step of eliminating includes eliminating nodes having a degree greater than two.

7. The method of claim 1, wherein the step of producing the local preconditioner includes independently and in parallel constructing local preconditioners for each of the pieces of the planar graph A.

8. The method of claim 7, wherein the step of independently and in parallel constructing the local preconditioners for each of the pieces of the planar graph A includes testing quality of the first local preconditioners.

9. The method of claim 8, further comprising the step of substituting different local preconditioners in response to the step of testing the quality of the local preconditioners.

10. The method of claim 9, further comprising the step of adjusting parameters of the recursive preconditioned iterative method in response to testing the quality of the local preconditioners.

11. The method of claim 1, wherein the step of generating the planar graph C includes eliminating nodes of degree one and degree two in the planar global preconditioner graph B of the planar graph A.

12. A method for constructing a multi-level solver for a linear system, the method comprising the steps of:
   a. providing a processor to execute the following steps of the method;
   b. providing a planar graph A of the system, wherein the planar graph A has an iteration count;

c. decomposing the planar graph A into a plurality of subgraphs;
d. producing a planar graph B for each of the plurality of subgraphs, wherein the planar graph B has an iteration count, wherein the iteration count of the planar graph A is the same as the iteration count of the planar graph B;
e. aggregating the planar graphs B of the plurality of subgraphs to form a global planar graph B;
f. generating a planar graph C based on the global planar graph B, wherein the planar graph C is smaller than the planar graph A, wherein the planar graph C has an iteration count,
g. forming a next planar graph A, wherein the next planar graph A is one iteration count higher than the iteration count of the planar graph A;
h. equating the next planar graph A to the planar graph C;
i. repeating steps c-h substituting the next planar graph A of step h for the planar graph A of step b until the planar graph C reaches a determined size;
j. forming a hierarchy of paired planar graphs A and B, wherein a paired planar graph A is paired with a paired planar graph B of a lower iteration count than the paired planar graph A; and
k. applying the hierarchy of paired planar graphs A and B to a recursive preconditioned iterative solver to solve the linear system.

13. The method of claim 12, wherein the planar graph B is a preconditioner planar graph B.

14. The method of claim 12, wherein the global planar graph B is a global preconditioner planar graph B.

* * * * *